US012596512B2

(12) United States Patent
Zhang et al.

(10) Patent No.: US 12,596,512 B2
(45) Date of Patent: Apr. 7, 2026

(54) CONTENT RENDERING METHOD AND APPARATUS, READABLE MEDIUM, AND ELECTRONIC DEVICE

(71) Applicant: Beijing Youzhuju Network Technology Co., Ltd., Beijing (CN)

(72) Inventors: Qi Zhang, Beijing (CN); Yujia Fu, Beijing (CN)

(73) Assignee: Beijing Youzhuju Network Technology Co., Ltd., Beijing (CN)

( * ) Notice: Subject to any disclaimer, the term of this patent is extended or adjusted under 35 U.S.C. 154(b) by 0 days.

(21) Appl. No.: 19/016,747

(22) Filed: Jan. 10, 2025

(65) Prior Publication Data

US 2025/0231726 A1     Jul. 17, 2025

(30) Foreign Application Priority Data

Jan. 12, 2024    (CN) .......................... 202410052338.5

(51) Int. Cl.
*G06F 3/14*          (2006.01)
(52) U.S. Cl.
CPC ..................................... *G06F 3/14* (2013.01)
(58) Field of Classification Search
CPC ................................. G06F 3/14; G06F 9/451
See application file for complete search history.

(56) References Cited

U.S. PATENT DOCUMENTS

| | | | | |
|---|---|---|---|---|
| 10,990,268 B2 * | 4/2021 | Luo | ..................... | G06F 3/04817 |
| 11,836,066 B2 * | 12/2023 | You | ..................... | G06F 18/2431 |
| 12,045,435 B2 * | 7/2024 | Sengupta | .............. | G06F 3/0482 |
| 12,353,897 B2 * | 7/2025 | Khorshid | ................ | G06F 3/011 |
| 2014/0149935 A1 * | 5/2014 | Johnson | ................ | G06F 3/0485 715/811 |
| 2019/0073636 A1 * | 3/2019 | Manske | ................. | G06Q 10/10 |
| 2023/0110815 A1 * | 4/2023 | Donovan | .............. | G06N 20/00 706/12 |
| 2023/0114826 A1 * | 4/2023 | Donovan | ......... | G06Q 10/06393 706/11 |

FOREIGN PATENT DOCUMENTS

| | | | | |
|---|---|---|---|---|
| CN | 111782918 A | * | 10/2020 | ......... G06F 16/9577 |
| CN | 114021694 A | | 2/2022 | |
| CN | 117010967 A | * | 11/2023 | ......... G06Q 30/0271 |

OTHER PUBLICATIONS

European Patent Office, Extended European Search Report Issued in Application No. 25150329.8, Jun. 3, 2025, Germany, 11 pages.

* cited by examiner

*Primary Examiner* — Vinh T Lam
(74) *Attorney, Agent, or Firm* — Alleman Hall LLP

(57) ABSTRACT

The present disclosure relates to a content rendering method and apparatus, a readable medium, and an electronic device. The method includes: obtaining a target content, where a plurality of display forms correspond to the target content; determining state information of the terminal device; determining, by using a local prediction model, an attribute prediction value of each display form based on the state information, where the local prediction model is configured to predict an attribute value of the display form based on the state information; and determining, from the plurality of display forms, a display form with a highest attribute prediction value as a target display form, and rendering the target content according to the target display form.

20 Claims, 2 Drawing Sheets

Obtaining a target content, where a plurality of display forms correspond to the target content — S101

Determining state information of the terminal device — S102

Determining, by using a local prediction model, an attribute prediction value of each display form based on the state information, where the local prediction model is configured to predict an attribute value of the display form based on the state information — S103

Determining, from the plurality of display forms, a display form with a highest attribute prediction value as a target display form, and rendering the target content according to the target display form — S104

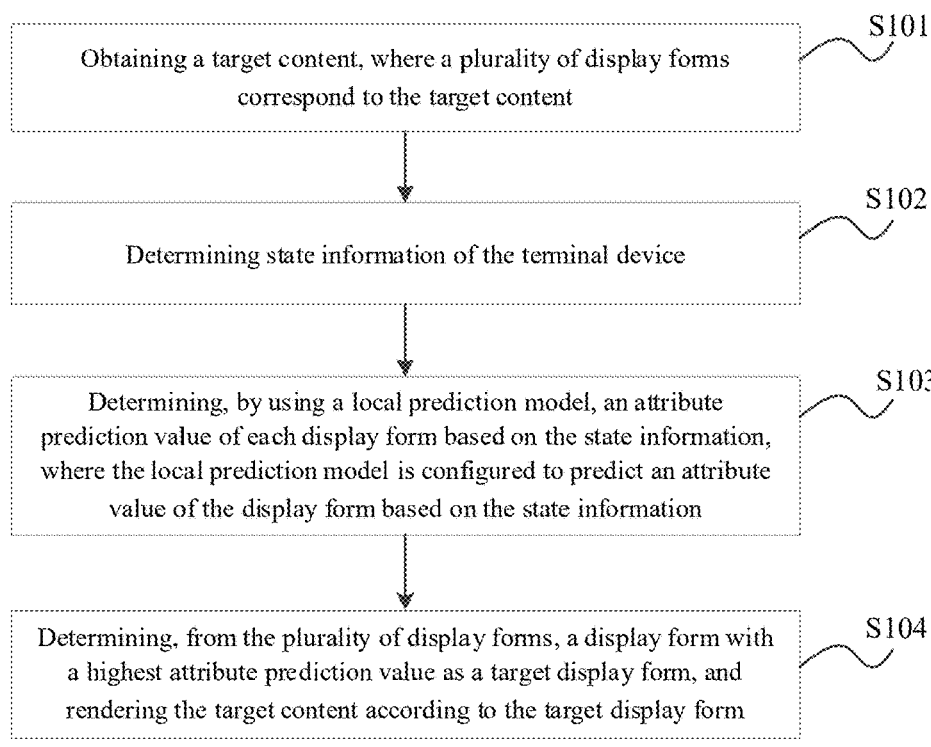

S101

Obtaining a target content, where a plurality of display forms correspond to the target content

S102

Determining state information of the terminal device

S103

Determining, by using a local prediction model, an attribute prediction value of each display form based on the state information, where the local prediction model is configured to predict an attribute value of the display form based on the state information

S104

Determining, from the plurality of display forms, a display form with a highest attribute prediction value as a target display form, and rendering the target content according to the target display form

FIG. 1

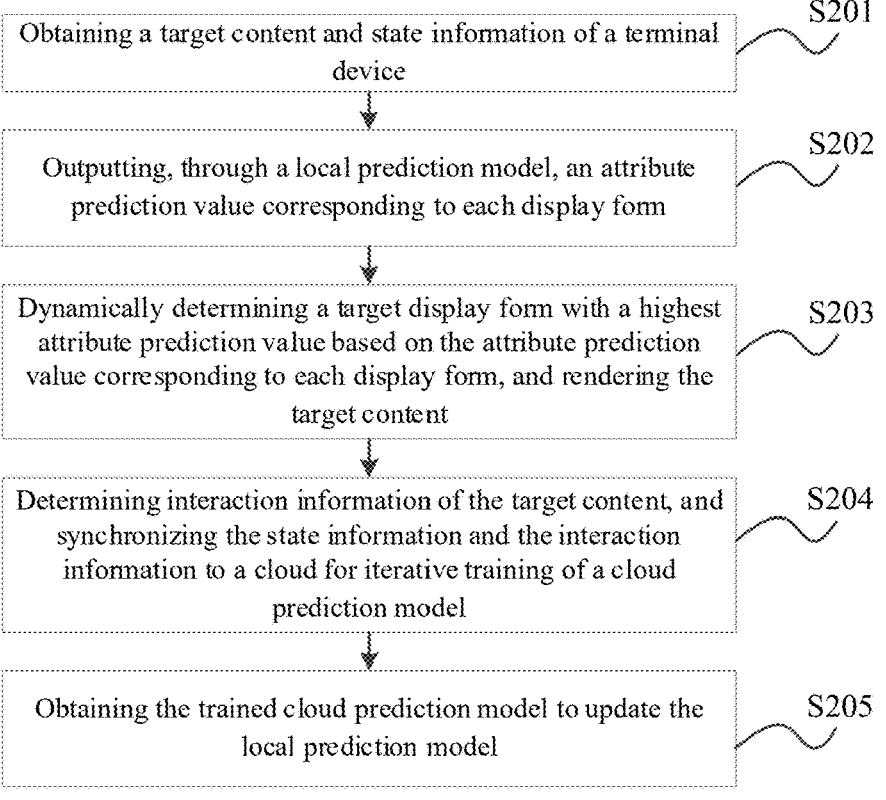

S201

Obtaining a target content and state information of a terminal device

S202

Outputting, through a local prediction model, an attribute prediction value corresponding to each display form

S203

Dynamically determining a target display form with a highest attribute prediction value based on the attribute prediction value corresponding to each display form, and rendering the target content

S204

Determining interaction information of the target content, and synchronizing the state information and the interaction information to a cloud for iterative training of a cloud prediction model

S205

Obtaining the trained cloud prediction model to update the local prediction model

FIG. 2

CONTENT RENDERING METHOD AND APPARATUS, READABLE MEDIUM, AND ELECTRONIC DEVICE

CROSS-REFERENCE TO RELATED APPLICATION

This application claims the priority to and benefits of Chinese Patent Application No. 202410052338.5, filed on Jan. 12, 2024. All the aforementioned patent application is hereby incorporated by reference in their entireties.

TECHNICAL FIELD

The present disclosure relates to the field of computer technologies, and in particular, to a content rendering method and apparatus, a readable medium, and an electronic device.

BACKGROUND

A common content rendering method in a web page and a mobile application is usually a static rendering method. Taking the case that a target content is displayed at a preset position of the web page, as an example, when the target content is determined, a display form of the target content, for example, a picture display form or a video display form, is also determined. In this case, when the web page is rendered, the target content is rendered based on the determined display form.

However, when a terminal device is in a low-bandwidth or unstable network environment, using the static rendering method may result in slow rendering of the target content or even rendering failure, and content rendering efficiency and content rendering effect are unstable.

SUMMARY

This section of Summary is provided to briefly introduce the concepts of the present disclosure, and these concepts will be described in detail in the section of Detailed Description of the present disclosure below. The section of Summary is not intended to identify key features or necessary features of the claimed technical solutions, nor is it intended to be used to limit the scope of the claimed technical solutions.

The present disclosure provides a content rendering method applied to a terminal device, and the method comprises:

obtaining a target content, a plurality of display forms corresponding to the target content;

determining state information of the terminal device;

determining, by using a local prediction model, an attribute prediction value of each display form based on the state information, the local prediction model being configured to predict an attribute value of the display form based on the state information; and determining, from the plurality of display forms, a display form with a highest attribute prediction value as a target display form, and rendering the target content according to the target display form.

The present disclosure provides a content rendering apparatus applied to a terminal device, and the apparatus comprises:

an obtaining module, configured to obtain a target content, a plurality of display forms corresponding to the target content;

a determination module, configured to determine state information of the terminal device;

a model prediction module, configured to determine, by using a local prediction model, an attribute prediction value of each display form based on the state information, the local prediction model being configured to predict an attribute value of the display form based on the state information; and a rendering module, configured to determine, from the plurality of display forms, a display form with a highest attribute prediction value as a target display form, and render the target content according to the target display form.

The present disclosure provides a non-transitory computer-readable medium having a computer program stored thereon, when the computer program is executed by a processor, the steps of the method according to any one embodiment of the present disclosure are implemented.

The present disclosure provides an electronic device, comprising:

a memory, having a computer program stored thereon; and a processor, configured to execute the computer program in the memory to implement the steps of the method according to any embodiment of the present disclosure.

Other features and advantages of the present disclosure will be described in detail in the section of Detailed Description of the present disclosure below.

BRIEF DESCRIPTION OF DRAWINGS

The above and other features, advantages, and aspects of each embodiment of the present disclosure may become more apparent with reference to the following specific embodiments and in conjunction with the accompanying drawings. Throughout the drawings, the same or similar reference numerals denote the same or similar elements. It should be understood that the accompanying drawings are schematic and that parts and elements are not necessarily drawn to scale. In the drawings:

FIG. 1 is a schematic flowchart of a content rendering method according to an embodiment of the present disclosure;

FIG. 2 is a schematic flowchart of a content rendering method according to an embodiment of the present disclosure;

DETAILED DESCRIPTION

Figure 3:
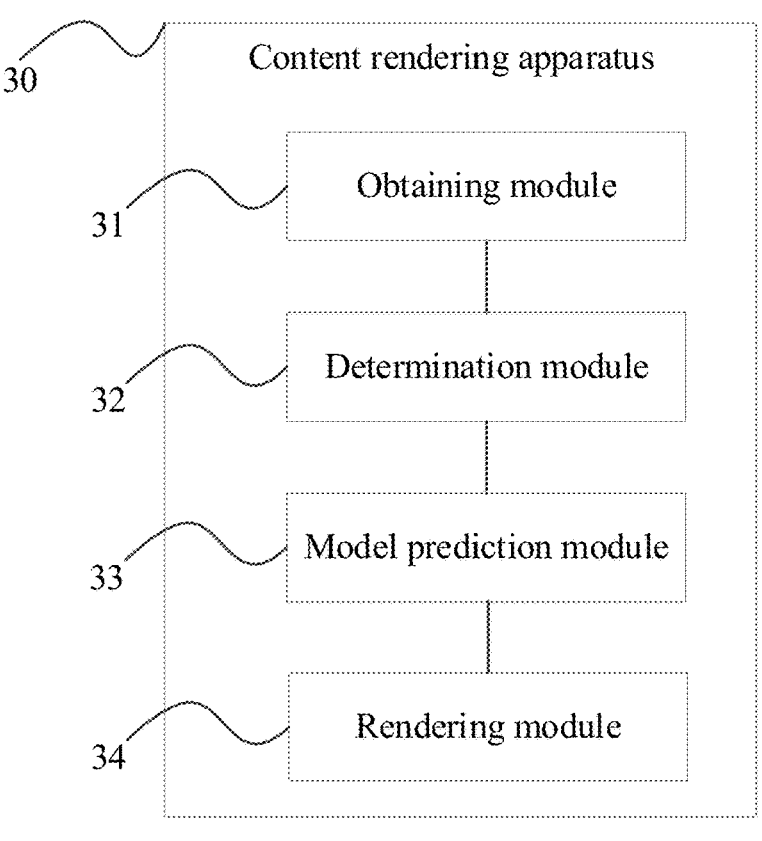
FIG. 3 is a block diagram of a content rendering apparatus according to an embodiment of the present disclosure.

Embodiments of the present disclosure are described in more detail below with reference to the accompanying drawings. Although some embodiments of the present disclosure are shown in the drawings, it should be understood that the present disclosure may be implemented in various forms and should not be construed as being limited to the embodiments set forth herein. On the contrary, these embodiments are provided for a more thorough and complete understanding of the present disclosure. It should be understood that the accompanying drawings and the embodiments of the present disclosure are only for exemplary purposes, and are not intended to limit the scope of protection of the present disclosure.

It should be understood that the various steps described in the method implementations of the present disclosure may be performed in different orders, and/or performed in parallel. In addition, additional steps may be included and/or the execution of the illustrated steps may be omitted in the method implementations. The scope of the present disclosure is not limited in this respect.

The term "include/comprise" and the variations thereof used herein are an open-ended inclusion, namely, "include/comprise but not limited to". The term "based on" is "at least partially based on". The term "an embodiment" means "at least one embodiment". The term "another embodiment" means "at least one another embodiment". The term "some embodiments" means "at least some embodiments". Related definitions of the other terms will be given in the description below.

It should be noted that concepts such as "first" and "second" mentioned in the present disclosure are only used to distinguish different apparatuses, modules, or units, and are not intended to limit the sequence of functions performed by these apparatuses, modules, or units or interdependence of these apparatuses, modules, or units.

It should be noted that the modifiers "one" and "a plurality of/more" mentioned in the present disclosure are illustrative and not restrictive, and those skilled in the art should understand that unless the context clearly indicates otherwise, the modifiers should be understood as "one or more".

Names of messages or information interacted between a plurality of apparatuses in the implementations of the present disclosure are used for illustrative purposes only, and are not used to limit the scope of these messages or information.

It may be understood that before the technical solutions disclosed in the embodiments of the present disclosure are used, the types, scope of use, use scenarios, and the like of personal information involved in the present disclosure should be informed to users and the users' authorization should be obtained in an appropriate manner in accordance with relevant laws and regulations.

For example, prompt information is sent to a user in response to receiving an active request from the user, to explicitly prompt the user that an operation requested by the user will require to obtain and use the user's personal information. Therefore, the user can independently choose, based on the prompt information, whether to provide personal information to software or hardware such as an electronic device, an application, a server, or a storage medium that performs an operation of the technical solution of the present disclosure.

As an optional but non-limiting implementation, in response to receiving an active request from a user, the prompt information may be sent to the user in a pop-up window, and the prompt information may be presented in text in the pop-up window. In addition, the pop-up window may also include a selection control for the user to choose "agree" or "disagree" to provide personal information to the electronic device.

It may be understood that the above process of notifying and obtaining the authorization of the user is only schematic and does not limit the implementation of the present disclosure. Other methods that meet relevant laws and regulations may also be applied to the implementation of the present disclosure.

In addition, it may be understood that the data involved in the technical solutions (including but not limited to the data itself, the acquisition or use of the data) should comply with the requirements of corresponding laws, regulations, and relevant provisions.

In some cases, when a terminal device is in a low-bandwidth or unstable network environment, using the static rendering method may result in slow rendering of the target content or even rendering failure, and content rendering efficiency and content rendering effect are unstable. In addition to the static rendering method, there is also a dynamic rendering method that determines a display form depending on a cloud server, a terminal device receives rendering data, that is determined by the cloud, including the display form, and then renders the target content, which requires interaction between the terminal device and the cloud before rendering, and thus there is a certain delay. In addition, when the terminal device is in a low-bandwidth or unstable network environment, an abnormal interaction may also result in slow rendering of the target content or even rendering failure.

In view of this, the present disclosure provides a content rendering method and apparatus, a readable medium, and an electronic device, to solve the above technical problems.

The following further describes the embodiments of the present disclosure with reference to the accompanying drawings.

FIG. 1 is a flowchart of a content rendering method according to an embodiment of the present disclosure. The method is applied to a terminal device. Referring to FIG. 1, the method includes the following steps S101-S104.

In S101, obtaining a target content, where a plurality of display forms correspond to the target content.

For example, the display form may be a picture display form, a video display form, or the like. The present disclosure does not specifically limit the display form.

It should be noted that the target content in the embodiments of the present disclosure may refer to a target content that needs to be rendered at a preset position on an interface in a web page or an application, for example, a start page content displayed in a picture form or a video form when an application is started. Alternatively, the target content may be a target content inserted in a data stream, for example, a target content inserted in a video stream of a short video application. The present disclosure is not limited in this aspect. In addition, the target content usually carries a jump link to another web page, another application, another interface of a current application, or the like, and a corresponding interface can be jumped to by triggering the target content, for example, by triggering a commodity promotion content to jump to a commodity purchase interface, and by triggering an activity promotion content to jump to an activity details page, etc. The present disclosure is not limited in this aspect.

In S102, determining state information of the terminal device.

In S103, determining, by using a local prediction model, an attribute prediction value of each display form based on the state information, where the local prediction model is configured to predict an attribute value of the display form based on the state information.

For example, the attribute value of the display form may be an interactive attribute value of the display form, such as a probability of being clicked or a conversion probability. The attribute prediction value may be an interactive attribute prediction value, such as a prediction probability of being clicked or a conversion prediction probability, etc.

In S104, determining, from the plurality of display forms, a display form with a highest attribute prediction value as a target display form, and rendering the target content according to the target display form.

According to the above technical solution, the target content is obtained, the plurality of display forms correspond to the target content, then the state information of the terminal device is determined, the attribute prediction value of each display form is determined, by using the local prediction model, based on the state information, and finally the display form with the highest attribute prediction value among the plurality of display forms is determined as the target display form, and the target content is rendered according to the target display form.

With the above method, the terminal device can predict the attribute prediction value of each display form by using the local prediction model and the state information, and select the display form with the highest attribute prediction value to render the target content, so that the display form of the target content can be dynamically selected in real time according to the state information of the terminal device for rendering, thereby improving content rendering efficiency and a rendering effect.

In some embodiments, the obtaining a target content may include: sending a content request to a content system in response to a content browsing operation; and obtaining the target content and a plurality of rendering data links that are sent by the content system in response to the content request, where the plurality of rendering data links correspond to the plurality of display forms in a one-to-one manner. The rendering the target content according to the target display form may include: obtaining target rendering data based on a rendering data link corresponding to the target display form; and rendering the target content based on the target rendering data.

For example, in response to the content browsing operation, the content request may be sent to the content system. For example, the content request is sent when a web page is rendered. Alternatively, taking a short video application as an example, the content request may be sent once every preset duration interval, or the content request is sent after several short videos are browsed. The content system may be a cloud server, a backend server, or the like. The content system is specifically determined based on an actual scenario, and the present disclosure does not limit this.

For example, the content request is sent to the content system, and the content system determines, in response to the content request, the target content and rendering data links, that is, storage addresses of rendering data, of different display forms of the target content, for example, a rendering data link of a picture form or a rendering data link of a video form, and returns the target content and the rendering data links to the terminal device. Taking a case that the target content is an activity promotion content as an example, the rendering data may be an activity promotion picture, an activity promotion video, or the like. After the target display form is determined, the target rendering data is obtained to the terminal device based on the rendering data link corresponding to the target display form, and then the target content is rendered based on the target rendering data, that is, the activity promotion picture or the activity promotion video is displayed on the terminal device.

In this way, the terminal device obtains the rendering data after the target display form is determined. For example, when the terminal device has a low bandwidth, picture rendering data is selected; when the terminal device has a high bandwidth, video rendering data is selected, which can not only improve the personalization degree of content, but also can dynamically obtain the rendering data for rendering in real time according to the state information of the terminal device, thereby improving the content rendering efficiency and the rendering effect.

In addition, in some embodiments, the same display form may also be refined, for example, pictures or videos of different resolutions, videos of different playing durations, and the like, so that a corresponding display form can be more flexibly matched based on the state information of the terminal device.

In some embodiments, the determining state information of the terminal device may include: determining at least one selected from a group comprising device state information and communication state information of the terminal device. The device state information includes at least one selected from a group comprising a central processing unit (CPU) utilization rate and a battery state, and the communication state information includes at least one selected from a group comprising network bandwidth state information and network delay state information.

For example, the obtained device state information of the terminal device may be, for example, the CPU utilization rate, the battery state, or the like. The communication state information may be, for example, the network bandwidth state information, the network delay state information, or the like. The device state information and the communication state information may be specifically set based on requirements and are not limited in the present disclosure.

In addition, in some embodiments, touch point information of the terminal device may also be obtained, to determine whether the user slides the screen with a left hand or a right hand, so that the target display form can be determined based on different operation manners, thereby improving the flexibility of matching the display form.

In some embodiments, the determining, by using a local prediction model, an attribute prediction value of each display form based on the state information may include: inputting the state information into a first local prediction sub-model to obtain a first attribute prediction value corresponding to each display form, the first local prediction sub-model being configured to predict a first-type attribute for each display form based on the state information; inputting the state information into a second local prediction sub-model to obtain a second attribute prediction value corresponding to each display form, the second local prediction sub-model being configured to predict a second-type attribute for each display form based on the state information; and determining, for each display form, the attribute prediction value of the display form based on the first attribute prediction value and the second attribute prediction value that correspond to the display form.

It should be understood that the first-type attribute may be an attribute such as a probability of being clicked, and the second-type attribute may be an attribute such as a conversion probability. The above example that the target content is the activity promotion content is used for further description, the first-type attribute may refer to a ratio of the number of times of clicking the target content to jump to an activity details page to the number of times of displaying the activity promotion content, that is, the probability of being clicked. The second-type attribute is a ratio of the number of users who actually participate in the activity to the number of users who visit the activity details page, that is, the conversion probability. The first-type attribute and the second-type attribute may be specifically determined according to an actual scenario, and are not limited in the present disclosure.

For example, a lightweight local prediction model may be run by using a chip or a graphics processing unit (GPU) of the terminal device. The local prediction model may be a machine learning model, and the present disclosure does not specifically limit the type of the local prediction model. The local prediction model may include the first local prediction sub-model and the second local prediction sub-model. The first local prediction sub-model is configured to predict the first-type attribute of each display form according to the state information. The second local prediction sub-model is configured to predict the second-type attribute of each display form according to the state information. The first local prediction sub-model and the second local prediction sub-model may perform a prediction process successively or in parallel, and the present disclosure does not impose any limitation on this.

Further, for each display form, the attribute prediction value of the display form is determined according to the first attribute prediction value and the second attribute prediction value that correspond to the display form. For example, the first attribute prediction value may be a click-through rate prediction value, and the second attribute prediction value may be a conversion rate prediction value. Correspondingly, an effective cost per mille (eCPM) may be calculated based on the first attribute prediction value and the second attribute prediction value as the attribute prediction value. For example, the eCPM is determined by using the following formula:

$$eCPM = cost \times first\ attribute\ prediction\ value \times second\ attribute\ prediction\ value \times 1000$$

where the cost refers to a cost required to display the target content.

Alternatively, the attribute prediction value may be determined based on a weight corresponding to the first attribute prediction value and a weight corresponding to the second attribute prediction value. For example, the attribute prediction value is equal to a product of the first attribute prediction value and the corresponding weight plus a product of the second attribute prediction value and the corresponding weight. The weight corresponding to the first attribute prediction value and the weight corresponding to the second attribute prediction value may be set as required, and are not limited in the present disclosure. In addition, the attribute prediction value of the display form may be determined based on another manner. The attribute prediction value may be specifically set according to the requirements, and is not limited in the present disclosure.

It should be noted that the first local prediction sub-model and the second local prediction sub-model may be obtained through pre-training based on sample data, and the sample data may be data, which is collected in advance, such as click data and conversion data corresponding to different display forms when the terminal device is in different states. In addition, model training may be performed on an initial prediction model on a cloud by using the sample data, and after the training is completed, the trained initial prediction model is sent to the terminal device.

In addition to the above-mentioned method of separately predicting the first attribute prediction value and the second attribute prediction value by using the trained first local prediction sub-model and the trained second local prediction sub-model, respectively, and then determining the attribute prediction value, the attribute prediction value may also be directly determined by using a local prediction model that has been trained and can directly predict the attribute prediction value. The training process of the local prediction model is similar to that of the sub-model.

In some embodiments, the determining, by using a local prediction model, an attribute prediction value of each display form based on the state information may include: inputting the state information into the local prediction model to obtain the attribute prediction value corresponding to each display form.

For example, the state information is input into the local prediction model that has been trained and can directly predict the attribute prediction value, so as to obtain the attribute prediction value corresponding to each display form. The attribute prediction value may be the above-mentioned eCPM, or may also be the attribute prediction value determined based on the weight corresponding to the first attribute prediction value and the weight corresponding to the second attribute prediction value, or another attribute prediction value, which is not limited in the present disclosure.

In this way, based on the trained prediction model, it can ensure prediction accuracy and prediction efficiency, thereby improving the content rendering efficiency and the rendering effect.

It should be noted that during the use of the local prediction model, the local prediction model may be iteratively updated. To avoid occupying resources of the terminal device, a cloud may perform a model iteration training process.

In some embodiments, the method further comprises: after the rendering the target content according to the target display form, determining interaction information of the target content; synchronizing the state information and the interaction information to a cloud, such that a cloud prediction model on the cloud performs model training based on the state information and the interaction information to obtain a trained cloud prediction model, the cloud prediction model being configured to predict the attribute value of the display form based on the state information; and obtaining the trained cloud prediction model, and updating the local prediction model based on the trained cloud prediction model.

For example, the interaction information is information indicating whether the user clicks on the target content displayed in the target display form or whether the conversion is successfully, or other interaction information corresponding to the attribute value. The interaction information is specifically determined according to the requirements and is not limited in the present disclosure.

For example, iterative training may be performed based on the training samples mentioned above. Then, a parameter of the cloud prediction model may be updated by using an optimization algorithm to minimize a prediction loss function of the model, to obtain the trained cloud prediction model. The terminal device obtains the trained cloud prediction model, and updates the local prediction model based on the trained cloud prediction model.

It should be understood that the terminal device may synchronize the state information and the interaction information after the target content is rendered once, or may synchronize the state information and the interaction information within the preset duration at intervals of the preset duration, or synchronize the state information and the interaction information based on a network condition of the terminal device, which is not limited in the present disclosure.

In some embodiments, the obtaining the trained cloud prediction model, and updating the local prediction model based on the trained cloud prediction model may comprise: obtaining the trained cloud prediction model once at intervals of a preset duration, and updating the local prediction model based on the trained cloud prediction model that is obtained.

For example, the trained cloud prediction model may be obtained once every preset duration, to update the local prediction model. It should be understood that the obtaining may fail due to a network exception, and in this case, the obtaining may be performed again after the preset duration elapses. In this way, not only resources of the terminal device are not occupied, but also the local prediction model can be iteratively updated.

FIG. 2 is a flowchart of a content rendering method according to an embodiment of the present disclosure. Referring to FIG. 2, the method includes the following steps S201-S205.

In S201, obtaining a target content and state information of a terminal device.

In S202, outputting, through a local prediction model, an attribute prediction value corresponding to each display form.

In S203, dynamically determining a target display form with a highest attribute prediction value based on the attribute prediction value corresponding to each display form, and rendering the target content.

For example, the attribute may be an interactive attribute of the display form, and the attribute prediction value may be an interactive attribute prediction value.

In S204, determining interaction information of the target content, and synchronizing the state information and the interaction information to a cloud for iterative training of a cloud prediction model.

In S205, obtaining the trained cloud prediction model to update the local prediction model.

With the above method, the terminal device can predict the attribute prediction value of each display form by using the local prediction model and the state information, and select the display form with the highest attribute prediction value to render the target content. Most of the data processing and analysis is performed by the terminal device, and thus the most real-time device state information can be used, so that the display form of the target content can be dynamically selected for rendering in real time according to the state information of the terminal device, thereby improving the content rendering efficiency and the rendering effect. In addition, the model is iteratively updated by the cloud, so that resources of the terminal device are not occupied, and the local prediction model can be iteratively updated.

Based on the same concept, the present disclosure further provides a content rendering apparatus applied to a terminal device. Referring to FIG. 3, the apparatus 30 includes:

an obtaining module 31, configured to obtain a target content, where a plurality of display forms correspond to the target content;

a determination module 32, configured to determine state information of the terminal device;

a model prediction module 33, configured to determine, by using a local prediction model, an attribute prediction value of each display form based on the state information, where the local prediction model is configured to predict an attribute value of the display form based on the state information;

a rendering module 34, configured to determine, from the plurality of display forms, a display form with a highest attribute prediction value as a target display form, and render the target content according to the target display form.

For example, the attribute may be an interactive attribute of the display form, and the attribute prediction value may be an interactive attribute prediction value.

For example, the apparatus 30 further includes a synchronization module, and the synchronization module is configured to:

after the rendering the target content according to the target display form, determine interaction information of the target content;

synchronize the state information and the interaction information to a cloud, such that a cloud prediction model on the cloud performs model training based on the state information and the interaction information to obtain a trained cloud prediction model, the cloud prediction model being configured to predict the attribute value of the display form based on the state information; and obtain the trained cloud prediction model, and update the local prediction model based on the trained cloud prediction model.

For example, the synchronization module is configured to:

obtain the trained cloud prediction model once at intervals of a preset duration, and update the local prediction model based on the trained cloud prediction model that is obtained.

For example, the model prediction module 33 is configured to:

input the state information into a first local prediction sub-model to obtain a first attribute prediction value corresponding to each display form, where the first local prediction sub-model is configured to predict a first-type attribute for each display form based on the state information;

input the state information into a second local prediction sub-model to obtain a second attribute prediction value corresponding to each display form, where the second local prediction sub-model is configured to predict a second-type attribute for each display form based on the state information; and determine, for each display form, the attribute prediction value of the display form based on the first attribute prediction value and the second attribute prediction value that correspond to the display form.

For example, the model prediction module 33 is configured to:

input the state information into the local prediction model to obtain the attribute prediction value corresponding to each display form.

For example, the obtaining module 31 is configured to:

send a content request to a content system in response to a content browsing operation; and obtain the target content and a plurality of rendering data links that are sent by the content system in response to the content request. The plurality of rendering data links are in one-to-one correspondence to the plurality of display forms.

For example, the rendering module 34 is configured to:

obtain target rendering data based on a rendering data link corresponding to the target display form; and render the target content based on the target rendering data.

For example, the determination module 32 is configured to:

determine at least one selected from a group comprising device state information and communication state information of the terminal device. The device state information comprises at least one selected from a group comprising a central processing unit utilization rate and a battery state, and the communication state information comprises at least one selected from a group comprising network bandwidth state information and network delay state information.

For the apparatus in the above embodiments, the specific manner in which each module performs an operation has been described in detail in the embodiments relating to the method, and will not be described in detail herein.

Based on the same concept, an embodiment of the present disclosure further provides a non-transitory computer-readable medium having a computer program stored thereon, when the computer program is executed by a processor, the steps of the content rendering method according to any embodiment of the present disclosure are implemented.

Based on the same concept, an embodiment of the present disclosure further provides an electronic device, comprising:

a memory, having a computer program stored thereon; and a processor, configured to execute the computer program in the memory to implement the steps of the content rendering method according to any embodiment of the present disclosure.

Figure 4:
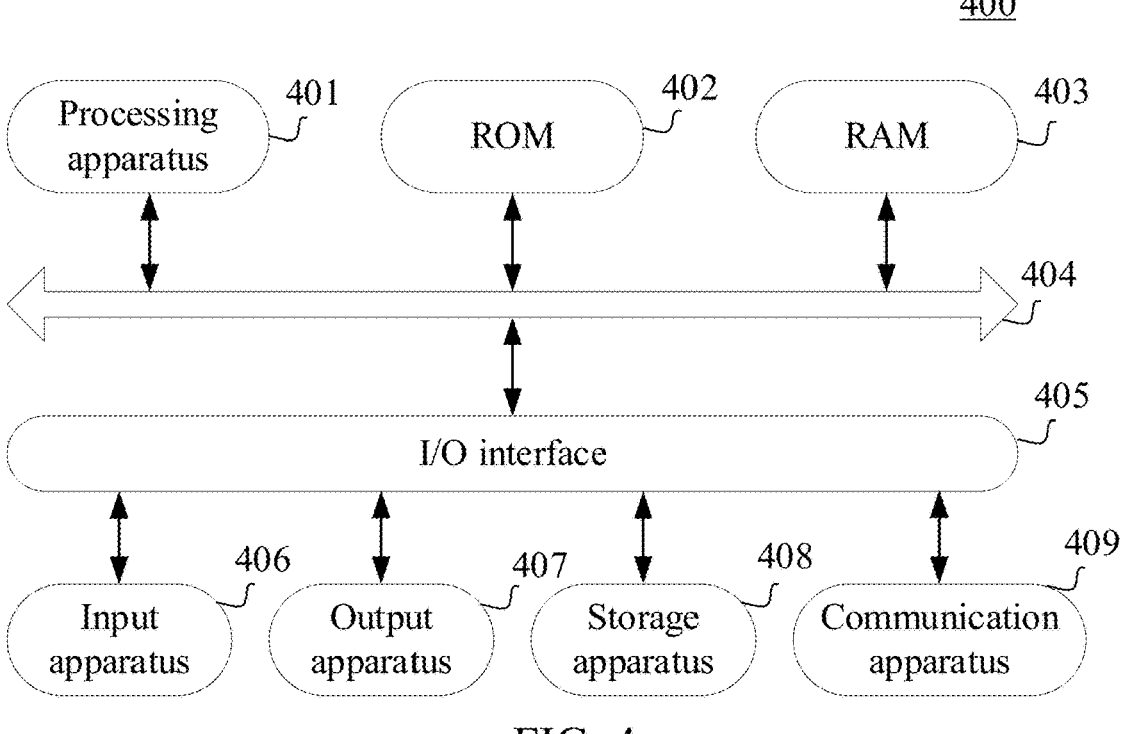
FIG. 4 is a block diagram of an electronic device according to an embodiment of the present disclosure.

Reference is made to FIG. 4 below, which shows a schematic diagram of a structure of an electronic device 400 suitable for implementing the embodiments of the present disclosure. The terminal device in the embodiments of the present disclosure may include, but is not limited to, mobile terminals such as a mobile phone, a notebook computer, a digital broadcast receiver, a PDA (Personal Digital Assistant), a PAD (tablet computer), a PMP (Portable Multimedia Player), and a vehicle-mounted terminal (for example, a vehicle navigation terminal), and fixed terminals such as a digital television (TV) and a desktop computer. The electronic device shown in FIG. 4 is merely an example, and should not impose any limitation on the function and scope of use of the embodiments of the present disclosure.

As shown in FIG. 4, the electronic device 400 may include a processing apparatus (such as a central processing unit, and a graphics processor, etc.) 401, which may perform a variety of appropriate actions and processing in accordance with a program stored in a read-only memory (ROM) 402 or a program loaded from a storage apparatus 408 into a random access memory (RAM) 403. The RAM 403 also stores various programs and data required for the operation of the electronic device 400. The processing apparatus 401, the ROM 402, and the RAM 403 are connected to each other through a bus 404. An input/output (I/O) interface 405 is also connected to the bus 404.

Generally, the following apparatuses may be connected to the I/O interface 405: an input apparatus 406 including, for example, a touch screen, a touchpad, a keyboard, a mouse, a camera, a microphone, an accelerometer, and a gyroscope; an output apparatus 407 including, for example, a liquid crystal display (LCD), a speaker, and a vibrator; the storage apparatus 408 including, for example, a magnetic tape and a hard disk; and a communication apparatus 409. The communication apparatus 409 may allow the electronic device 400 to perform wireless or wired communication with other devices to exchange data. Although FIG. 4 shows the electronic device 400 having various apparatuses, it should be understood that it is not required to implement or have all of the shown apparatuses. It may be an alternative to implement or have more or fewer apparatuses.

In particular, according to an embodiment of the present disclosure, the process described above with reference to the flowcharts may be implemented as a computer software program. For example, the embodiment of the present disclosure includes a computer program product, which includes a computer program carried on a non-transitory computer-readable medium, the computer program includes program codes for performing the method shown in the flowchart. In such an embodiment, the computer program may be downloaded and installed from a network through the communication apparatus 409, or installed from the storage apparatus 408, or installed from the ROM 402. When the computer program is executed by the processing apparatus 401, the above-mentioned functions defined in the method of the embodiment of the present disclosure are executed.

It should be noted that the above computer-readable medium described in the present disclosure may be a computer-readable signal medium, a computer-readable storage medium, or any combination thereof. For example, the computer-readable storage medium may be, but not limited to, electric, magnetic, optical, electromagnetic, infrared, or semiconductor systems, apparatuses, or devices, or any combination thereof. A more specific example of the computer-readable storage medium may include, but is not limited to: an electrical connection having one or more wires, a portable computer magnetic disk, a hard disk, a random access memory (RAM), a read-only memory (ROM), an erasable programmable read-only memory (EPROM) or flash memory, an optical fiber, a portable compact disk read-only memory (CD-ROM), an optical storage device, a magnetic storage device, or any suitable combination thereof. In the present disclosure, the computer-readable storage medium may be any tangible medium containing or storing a program, the program may be used by or in combination with an instruction execution system, apparatus, or device. In the present disclosure, the computer-readable signal medium may include a data signal propagated in a baseband or as a part of a carrier, the data signal carries the computer-readable program code. The data signal propagated in this way may be in various forms, including but not limited to an electromagnetic signal, an optical signal, or any suitable combination thereof. The computer-readable signal medium may also be any computer-readable medium other than the computer-readable storage medium. The computer-readable signal medium can send, propagate, or transmit a program used by or in combination with an instruction execution system, apparatus, or device. The program code contained in the computer-readable medium may be transmitted by any suitable medium, including but not limited to: electric wires, optical cables, radio frequency (RF), and the like, or any suitable combination thereof.

In some implementations, the client and the server may communicate by using any currently known or future-developed network protocol such as a HyperText Transfer Protocol (HTTP), and may be connected to digital data communication (for example, a communication network) in any form or medium. Examples of the communication network include a local area network ("LAN"), a wide area network ("WAN"), an internet work (for example, the Internet), an end-to-end network (for example, an ad hoc end-to-end network), and any currently known or future-developed network.

The above computer-readable medium may be included in the above electronic device. Alternatively, the above computer-readable medium may exist independently, without being assembled into the electronic device.

The above computer-readable medium carries one or more programs, when the one or more programs are executed by the electronic device, the electronic device is caused to perform the following operations: obtaining a target content, where a plurality of display forms correspond to the target content; determining state information of the terminal device; determining, by using a local prediction model, an attribute prediction value of each display form based on the state information, where the local prediction model is configured to predict an attribute value of the display form based on the state information; and determining, from the plurality of display forms, a display form with a highest attribute prediction value as a target display form, and rendering the target content based on the target display form.

The computer program code for performing the operations in the present disclosure may be written in one or more programming languages or a combination thereof, the above programming languages include but are not limited to an object-oriented programming language, such as Java, Smalltalk, and C++, and further include conventional procedural programming languages, such as "C" language or similar programming languages. The program code may be completely executed on a computer of a user, partially executed on a computer of a user, executed as an independent software package, partially executed on a computer of a user and partially executed on a remote computer, or completely executed on a remote computer or server. In the case involving a remote computer, the remote computer may be connected to the computer of the user by any type of networks, including a local area network (LAN) or a wide area network (WAN), or may be connected to an external computer (for example, connected over the Internet with the aid of an Internet service provider).

The flowcharts and block diagrams in the accompanying drawings illustrate the possibly implemented system architectures, functions, and operations of the system, the method, and the computer program product according to various embodiments of the present disclosure. In this regard, each block in the flowchart or block diagram may represent a module, a program segment, or a part of a code, and the module, program segment, or part of code contains one or more executable instructions for implementing the specified logical functions. It should also be noted that, in some alternative implementations, the functions marked in the blocks may also occur in an order different from that marked in the accompanying drawings. For example, two blocks shown in succession may actually be executed substantially in parallel, or they may sometimes be executed in the reverse order, depending on the functions involved. It should also be noted that each block in the block diagram and/or the flowchart, and a combination of the blocks in the block diagram and/or the flowchart may be implemented by a dedicated hardware-based system that executes specified functions or operations, or may be implemented by a combination of dedicated hardware and computer instructions.

The modules described in the embodiments of the present disclosure may be implemented by software, or may be implemented by hardware. The name of a module does not constitute a limitation on the module itself in some cases.

The functions described above in the present disclosure may be performed at least partially by one or more hardware logic components. For example, without limitation, exemplary types of hardware logic components that may be used include: a field programmable gate array (FPGA), an application-specific integrated circuit (ASIC), an application-specific standard product (ASSP), a system on chip (SOC), a complex programmable logic device (CPLD), and the like.

In the context of the present disclosure, a machine-readable medium may be a tangible medium that may contain or store a program for use by or in combination with an instruction execution system, apparatus, or device. The machine-readable medium may be a machine-readable signal medium or a machine-readable storage medium. The machine-readable medium may include but is not limited to electronic, magnetic, optical, electromagnetic, infrared, or semiconductor systems, apparatuses, or devices, or any suitable combination thereof. A more specific example of the machine-readable storage medium may include an electrical connection based on one or more wires, a portable computer disk, a hard disk, a random-access memory (RAM), a read-only memory (ROM), an erasable programmable read-only memory (EPROM) (or flash memory), an optic fiber, a portable compact disk read-only memory (CD-ROM), an optical storage device, a magnetic storage device, or any suitable combination thereof.

The above descriptions are merely some embodiments of the present disclosure and an illustration of the applied technical principles. Persons skilled in the art should understand that the scope of disclosure involved in the present disclosure is not limited to the technical solution formed by the specific combination of the above technical features, and shall also cover other technical solutions formed by any combination of the above technical features or equivalent features thereof without departing from the concept of the present disclosure, for example, a technical solution formed by replacing the above features with technical features with similar functions disclosed in the present disclosure (but not limited thereto).

In addition, although the operations have been described in a specific order, it should not be understood as requiring these operations to be performed in the specific order shown or in sequential order. Under certain circumstances, multi-tasking and parallel processing may be advantageous. Similarly, although several specific implementation details are included in the foregoing discussions, these details should not be construed as limiting the scope of the present disclosure. Some features that are described in the context of separate embodiments can also be implemented in combination in a single embodiment. On the contrary, various features described in the context of a single embodiment can also be implemented in a plurality of embodiments individually or in any suitable sub-combination.

Although the subject matter has been described in a language specific to structural features and/or logical actions of the method, it should be understood that the subject matter defined in the appended claims is not necessarily limited to the specific features or actions described above. On the contrary, the specific features and actions described above are merely exemplary forms for implementing the technical solutions defined by the claims. With respect to the apparatus in the above embodiments, the specific manner in which each module performs an operation has been described in detail in the embodiments related to the method, and will not be described in detail here.

The invention claimed is:

1. A content rendering method, applied to a terminal device, wherein the method comprises:

obtaining a target content, wherein a plurality of display forms correspond to the target content;

determining state information of the terminal device;

determining, by using a local prediction model, an attribute prediction value of each display form based on the state information, wherein the local prediction model is configured to predict an attribute value of the display form based on the state information; and determining, from the plurality of display forms, a display form with a highest attribute prediction value as a target display form, and rendering the target content according to the target display form.

2. The method according to claim 1, further comprising:

after the rendering the target content according to the target display form, determining interaction information of the target content;

synchronizing the state information and the interaction information to a cloud, such that a cloud prediction model on the cloud performs model training based on the state information and the interaction information to obtain a trained cloud prediction model, wherein the cloud prediction model is configured to predict the attribute value of the display form based on the state information; and obtaining the trained cloud prediction model, and updating the local prediction model based on the trained cloud prediction model.

3. The method according to claim 2, wherein the obtaining the trained cloud prediction model, and updating the local prediction model based on the trained cloud prediction model comprises:

obtaining the trained cloud prediction model once at intervals of a preset duration, and updating the local prediction model based on the trained cloud prediction model that is obtained.

4. The method according to claim 1, wherein the determining, by using a local prediction model, an attribute prediction value of each display form based on the state information comprises:

inputting the state information into a first local prediction sub-model to obtain a first attribute prediction value corresponding to each display form, wherein the first local prediction sub-model is configured to predict a first-type attribute for each display form based on the state information;

inputting the state information into a second local prediction sub-model to obtain a second attribute prediction value corresponding to each display form, wherein the second local prediction sub-model is configured to predict a second-type attribute for each display form based on the state information; and determining, for each display form, the attribute prediction value of the display form based on the first attribute prediction value and the second attribute prediction value that correspond to the display form.

5. The method according to claim 1, wherein the determining, by using a local prediction model, an attribute prediction value of each display form based on the state information comprises:

inputting the state information into the local prediction model to obtain the attribute prediction value corresponding to each display form.

6. The method according to claim 1, wherein the obtaining a target content comprises:

sending a content request to a content system in response to a content browsing operation; and obtaining the target content and a plurality of rendering data links that are sent by the content system in response to the content request, wherein the plurality of rendering data links correspond to the plurality of display forms in a one-to-one manner; and the rendering the target content according to the target display form comprises:

obtaining target rendering data based on a rendering data link corresponding to the target display form; and rendering the target content based on the target rendering data.

7. The method according to claim 2, wherein the obtaining a target content comprises:

sending a content request to a content system in response to a content browsing operation; and obtaining the target content and a plurality of rendering data links that are sent by the content system in response to the content request, wherein the plurality of rendering data links correspond to the plurality of display forms in a one-to-one manner; and the rendering the target content according to the target display form comprises:

obtaining target rendering data based on a rendering data link corresponding to the target display form; and rendering the target content based on the target rendering data.

8. The method according to claim 4, wherein the obtaining a target content comprises:

sending a content request to a content system in response to a content browsing operation; and obtaining the target content and a plurality of rendering data links that are sent by the content system in response to the content request, wherein the plurality of rendering data links correspond to the plurality of display forms in a one-to-one manner; and the rendering the target content according to the target display form comprises:

obtaining target rendering data based on a rendering data link corresponding to the target display form; and rendering the target content based on the target rendering data.

9. The method according to claim 5, wherein the obtaining a target content comprises:

sending a content request to a content system in response to a content browsing operation; and obtaining the target content and a plurality of rendering data links that are sent by the content system in response to the content request, wherein the plurality of rendering data links correspond to the plurality of display forms in a one-to-one manner; and the rendering the target content according to the target display form comprises:

obtaining target rendering data based on a rendering data link corresponding to the target display form; and rendering the target content based on the target rendering data.

10. The method according to claim 1, wherein the determining state information of the terminal device comprises:

determining at least one selected from a group comprising device state information and communication state information of the terminal device, wherein the device state information comprises at least one selected from a group comprising a central processing unit utilization rate and a battery state, and the communication state information comprises at least one selected from a group comprising network bandwidth state information and network delay state information.

11. The method according to claim 2, wherein the determining state information of the terminal device comprises:

determining at least one selected from a group comprising device state information and communication state information of the terminal device, wherein the device state information comprises at least one selected from a group comprising a central processing unit utilization rate and a battery state, and the communication state information comprises at least one selected from a group comprising network bandwidth state information and network delay state information.

12. The method according to claim 4, wherein the determining state information of the terminal device comprises:

determining at least one selected from a group comprising device state information and communication state information of the terminal device, wherein the device state information comprises at least one selected from a group comprising a central processing unit utilization rate and a battery state, and the communication state information comprises at least one selected from a group comprising network bandwidth state information and network delay state information.

13. A non-transitory computer-readable medium having a computer program stored thereon, wherein when the computer program is executed by a processor, steps of a content rendering method are implemented, wherein the method is applied to a terminal device, and the steps of the method comprises:

obtaining a target content, wherein a plurality of display forms correspond to the target content;

determining state information of the terminal device;

determining, by using a local prediction model, an attribute prediction value of each display form based on the state information, wherein the local prediction model is configured to predict an attribute value of the display form based on the state information; and determining, from the plurality of display forms, a display form with a highest attribute prediction value as a target display form, and rendering the target content according to the target display form.

14. An electronic device, comprising:

a memory, having a computer program stored thereon; and a processor, configured to execute the computer program in the memory to implement steps of a content rendering method, wherein the method is applied to a terminal device, and the steps of the method comprises:

obtaining a target content, wherein a plurality of display forms correspond to the target content;

determining state information of the terminal device;

determining, by using a local prediction model, an attribute prediction value of each display form based on the state information, wherein the local prediction model is configured to predict an attribute value of the display form based on the state information; and determining, from the plurality of display forms, a display form with a highest attribute prediction value as a target display form, and rendering the target content according to the target display form.

15. The electronic device according to claim 14, wherein the processor executes the computer program in the memory to further implement following steps:

after the rendering the target content according to the target display form, determining interaction information of the target content;

synchronizing the state information and the interaction information to a cloud, such that a cloud prediction model on the cloud performs model training based on the state information and the interaction information to obtain a trained cloud prediction model, wherein the cloud prediction model is configured to predict the attribute value of the display form based on the state information; and obtaining the trained cloud prediction model, and updating the local prediction model based on the trained cloud prediction model.

16. The electronic device according to claim 15, wherein the obtaining the trained cloud prediction model, and updating the local prediction model based on the trained cloud prediction model comprises:

obtaining the trained cloud prediction model once at intervals of a preset duration, and updating the local prediction model based on the trained cloud prediction model that is obtained.

17. The electronic device according to claim 14, wherein the determining, by using a local prediction model, an attribute prediction value of each display form based on the state information comprises:

inputting the state information into a first local prediction sub-model to obtain a first attribute prediction value corresponding to each display form, wherein the first local prediction sub-model is configured to predict a first-type attribute for each display form based on the state information;

inputting the state information into a second local prediction sub-model to obtain a second attribute prediction value corresponding to each display form, wherein the second local prediction sub-model is configured to predict a second-type attribute for each display form based on the state information; and determining, for each display form, the attribute prediction value of the display form based on the first attribute prediction value and the second attribute prediction value that correspond to the display form.

18. The electronic device according to claim 14, wherein the determining, by using a local prediction model, an attribute prediction value of each display form based on the state information comprises:

inputting the state information into the local prediction model to obtain the attribute prediction value corresponding to each display form.

19. The electronic device according to claim 14, wherein the obtaining a target content comprises:

sending a content request to a content system in response to a content browsing operation; and obtaining the target content and a plurality of rendering data links that are sent by the content system in response to the content request, wherein the plurality of rendering data links correspond to the plurality of display forms in a one-to-one manner; and the rendering the target content according to the target display form comprises:

obtaining target rendering data based on a rendering data link corresponding to the target display form; and rendering the target content based on the target rendering data.

20. The electronic device according to claim 14, wherein the determining state information of the terminal device comprises:

determining at least one selected from a group comprising device state information and communication state information of the terminal device, wherein the device state information comprises at least one selected from a group comprising a central processing unit utilization rate and a battery state, and the communication state information comprises at least one selected from a group comprising network bandwidth state information and network delay state information.

* * * * *